(12) United States Patent
Nishida et al.

(10) Patent No.: US 7,075,743 B2
(45) Date of Patent: Jul. 11, 2006

(54) METHOD OF SERVO WRITING FOR MAGNETIC RECORDING SYSTEM, MAGNETIC RECORDING SYSTEM

(75) Inventors: Yasutaka Nishida, Kodaira (JP); Takehiko Hamaguchi, Fuchu (JP); Hideki Sawaguchi, Kokubunji (JP); Hisashi Takano, Kodaira (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 290 days.

(21) Appl. No.: 09/924,762

(22) Filed: Aug. 9, 2001

(65) Prior Publication Data
US 2002/0057509 A1     May 16, 2002

(30) Foreign Application Priority Data
Nov. 10, 2000 (JP) ............... 2000-349312

(51) Int. Cl.
*G11B 5/09* (2006.01)
(52) U.S. Cl. ........................................ 360/48
(58) Field of Classification Search ............ 360/48, 360/77.08, 43, 44, 49, 77.02, 51; 428/694 T
See application file for complete search history.

(56) References Cited

U.S. PATENT DOCUMENTS

| | | | | |
|---|---|---|---|---|
| 4,188,646 A | * | 2/1980 | Sordello et al. | 360/77.08 |
| 4,454,549 A | * | 6/1984 | Pennington | 360/77.08 |
| 4,472,750 A | * | 9/1984 | Klumpp et al. | 360/78.01 |
| 4,530,020 A | * | 7/1985 | Sutton | 360/77.04 |
| 4,875,114 A | * | 10/1989 | Moteki | 360/77.08 |
| 5,121,270 A | * | 6/1992 | Alcudia et al. | 360/77.01 |
| 5,453,887 A | * | 9/1995 | Negishi et al. | 360/77.01 |
| 5,966,264 A | * | 10/1999 | Belser et al. | 360/77.08 |
| 6,025,970 A | * | 2/2000 | Cheung | 360/77.08 |
| 6,078,445 A | * | 6/2000 | Serrano et al. | 360/46 |
| 6,134,070 A | * | 10/2000 | Tran et al. | 360/75 |
| 6,236,525 B1 | * | 5/2001 | Cates et al. | 360/51 |
| 6,359,744 B1 | | 3/2002 | Mallary | 360/40 |
| 6,377,416 B1 | * | 4/2002 | Kikuta | 360/77.02 |
| 6,411,452 B1 | * | 6/2002 | Cloke | 360/51 |
| 6,490,111 B1 | * | 12/2002 | Sacks | 360/53 |
| 6,602,620 B1 | * | 8/2003 | Kikitsu et al. | 428/694 T |
| 6,731,446 B1 | * | 5/2004 | Ikeda et al. | 360/59 |

FOREIGN PATENT DOCUMENTS

| | | |
|---|---|---|
| JP | 58-222468 | 5/1983 |
| JP | 64-048276 | 8/1987 |
| JP | 11-224473 | 2/1998 |

* cited by examiner

*Primary Examiner*—David Hudspeth
*Assistant Examiner*—Glenda P. Rodriguez
(74) *Attorney, Agent, or Firm*—Reed Smith LLP; Stanley P. Fisher, Esq.; Juan Carlos A. Marquez, Esq.

(57) ABSTRACT

In a method of servo writing of a magnetic recording system and the magnetic recording system, the signal is recorded in a dummy area with a higher recording density than the burst signal. Also, the maximum bit length of the burst area is shortened as compared with the maximum bit length of the data area. A servo control method for perpendicular recording similar to that for longitudinal recording can be used to reduce the development cost. The anti-signal decay performance is also improved. Further, since the variations of the burst signal along the track width is suppressed, the positioning accuracy is improved. These effects combine to produce a reliable magnetic recording system of large capacity.

25 Claims, 17 Drawing Sheets

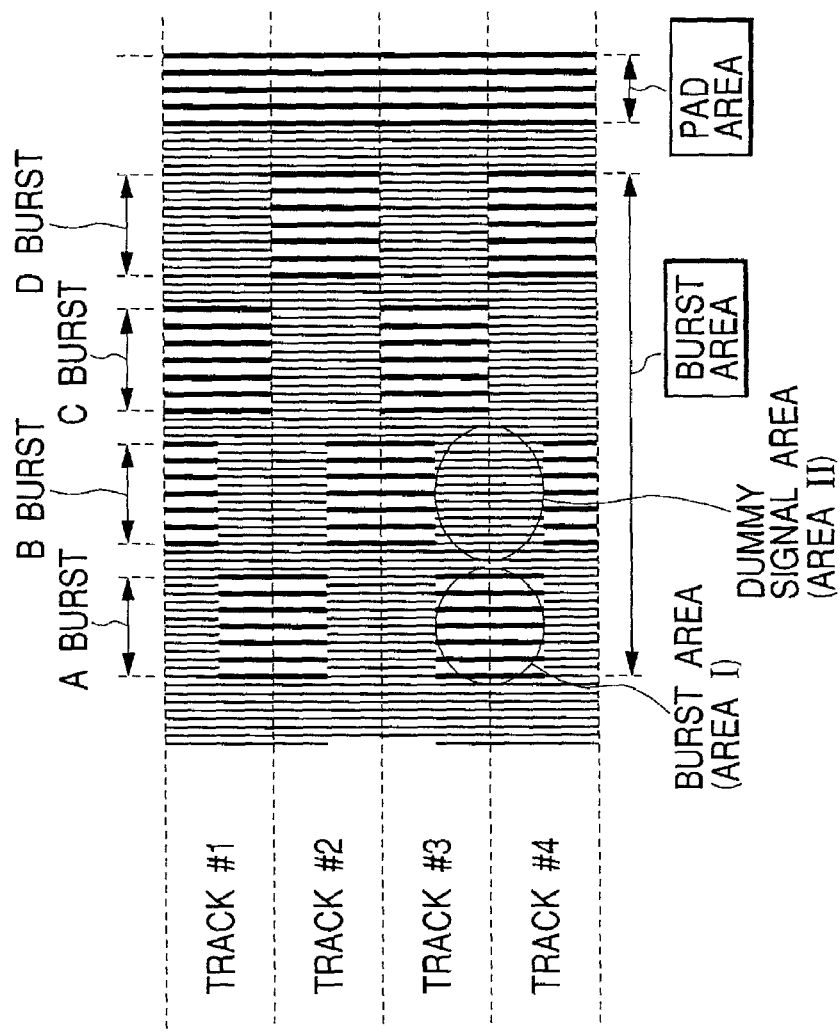

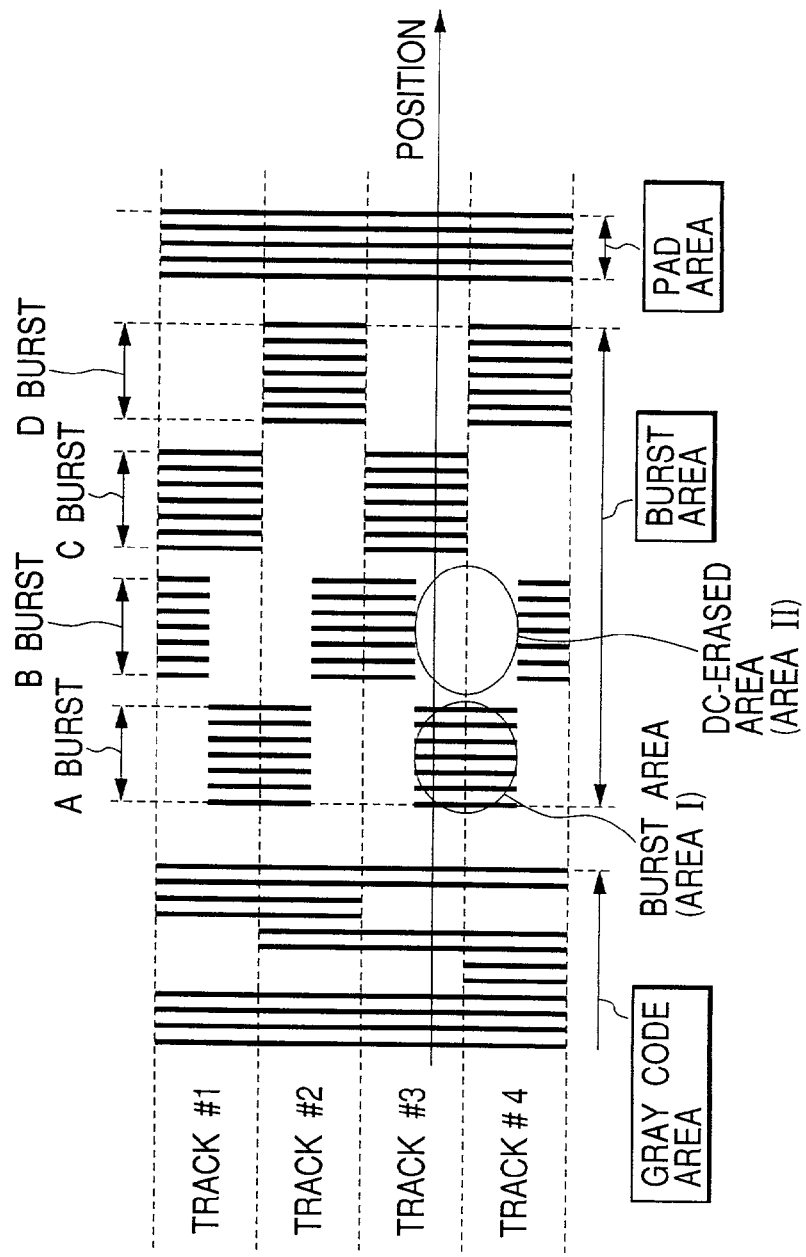

RECORDED MAGNETIZATION STATE FOR LONGITUDINAL RECORDING

WAVEFORM OF REPRODUCED SIGNAL FOR LONGITUDINAL RECORDING

RECORDED MAGNETIZATION STATE FOR PERPENDICULAR RECORDING

WAVEFORM OF REPRODUCED SIGNAL FOR PERPENDICULAR RECORDING

METHOD OF SERVO WRITING FOR MAGNETIC RECORDING SYSTEM, MAGNETIC RECORDING SYSTEM

BACKGROUND OF THE INVENTION

1. Field of the Invention

The present invention relates to a magnetic recording system comprising perpendicular magnetic recording media.

2. Description of the Related Art

The magnetic recording system is such that the head is moved radially of a rotating disk and accurately set in position on an intended data track to write and read information magnetically. A top plane view of the interior of a housing (enclosure) of a typical magnetic recording system is shown in FIG. 10, and a sectional view of the magnetic recording system is shown in FIG. 11. These diagrams illustrate a magnetic recording system configured of six heads, three disks, a rotary actuator, a voice coil motor, a head amplifier and a package board.

The three disks are fixed on a single rotary shaft and driven at the rotation speed of 3000 to 15000 rpm around a point A by a spindle motor. The six heads are fixed on a single comb-shaped arm and rotationally driven around a point B by a rotary actuator. This mechanism permits the heads to move freely radially of the disk. The rotary actuator is suitable for reducing the size of the mechanism, and therefore is employed by all the magnetic recording systems recently made available on the market. Also, for detecting the radial position of the heads, servo areas are formed at substantially regular intervals of rotation angle on the disk. A detailed explanation will be given later of the arrangement of the servo areas and the data areas and means for detecting the radial position of the heads based on the servo areas. A package board has mounted thereon a hard disk controller (HDC), an interface circuit, a signal processor, etc. The head amplifier is often mounted in the enclosure in the neighborhood of the heads in order to improve the SN ratio and the transfer rate.

A plane view with the disk partially enlarged is shown in FIG. 12. The head can be moved to an arbitrary radial position on the disk by the rotary actuator, but when writing. or reading data, is fixed at a specific radial position. As shown in FIG. 12, concentric tracks are formed substantially equidistantly. By way of explanation, only five tracks are shown in solid lines. Actually, however, the tracks, which are magnetically formed, cannot be optically viewed directly. Although the track width is shown in enlarged form, an actual magnetic recording system has tracks in the number of several tens of thousands formed at intervals narrower than 1 μm from the inner to outer peripheries of the disk.

For performing the operation of following a specific track, a technique is widely used in which a special pattern called the servo pattern is recorded before product shipment and a head position signal is obtained from this pattern. This technique is disclosed in JP-A-58-222468. The servo pattern is formed in the portions designated as servo areas in FIGS. 10 and 13. Each servo area and each data area are spaced from each other through a gap for absorbing the variations of the rotation speed. Further, each data area is divided into sector blocks of about 600 bytes including the user data of 512 bytes and management information. The main difference between the servo data and the data area is that the data area is rewritten frequently in response to a user instruction whereas the servo area is not rewritten after product shipment.

About 50 to 100 servo areas are formed at substantially equal angular intervals on the disk. The number of the data areas is greater than that of the servo areas, and therefore several data areas exist between given two servo areas. FIG. 13 shows an example in which a data area #1 is arranged between servo areas #1 and #2, and the data area #1 has three sector blocks #1 to #3 for each of four tracks #1 to #4. An actual magnetic recording system has ten thousand or more tracks, and a portion of the tracks is shown in perpendicularly enlarged form in FIG. 13.

A pattern having a bit-direction timing synchronized between radially adjacent tracks is recorded in each servo area. For forming such a special pattern, a clock synchronized with disk rotation is required. A servo pattern is normally formed with a device called the servo track writer having the aforementioned function. A method of forming servo areas in this way is disclosed, for example, in JP-A-64-48276.

A general structure of a pattern formed in the servo areas and a method of producing the head position signal called the servo information from the servo pattern are shown in FIG. 14. In the pattern shown in FIG. 14, an ISG (Initial Signal Gain) area is a continuous pattern formed to reduce the effect of variations in the flying height and the magnetic characteristics of the recording film of each disk. A servo decoder reproduces the ISG area by turning on an automatic gain control (AGC). At the time point when a SVAM (SerVo Address Mark) area is detected, the AGC is turned off thereby to realize the function of standardizing the reproduction amplitude of the subsequent burst areas using the amplitude of the ISG area. A gray code area is for describing the track number information of each track by the gray code. The sector number information may also be described in this area. A burst area has a hound's tooth check pattern for producing accurate radial position information and is required for the head to follow each track accurately. This pattern is configured of a combination of A and B bursts formed between the center lines of adjacent servo tracks over the boundary of the particular tracks on the one hand and a combination of C and D bursts formed about the center lines of the servo tracks on the other hand. A pad area is a pattern formed for absorbing the delay of the servo decoder and peripheral circuits so that the servo decoder can maintain the clock generation during the reproduction of the servo area.

The head reproduces the servo area while running along the position curve C indicated by arrow from left to right in FIG. 14. A part of the waveform reproduced by this operation is shown in FIG. 15. For facilitating the understanding, the reproduced waveforms of the SVAM area, the gray code area and the pad area are not shown. The servo decoder detects the amplitude of the four burst areas A to D. The reproduction signal of each burst area is converted into a digital value by an A/D converter, and the amplitude is detected by integration or Fourier computation. The amplitude difference between the A burst area and the B burst area makes up an N position signal. FIG. 15 includes an equation for standardizing the amplitude difference with the ISG amplitude. This function is implemented by the servo decoder controlling the AGC in such a manner as to secure a constant amplitude of the ISG area. In similar fashion, the amplitude difference between the C burst area and the D burst area constitutes a Q position signal. The head position signals produced in the manner described above are shown in FIG. 16. The N position signal assumes 0 at position B where the head center covers the A burst area and the B burst area equally, and changes between positive and negative values substantially in proportion to the amount of displacement from the center position. From the reproduced waveform (reproduced waveform at position C in FIG. 14) shown in FIG. 15, for example, the N position signal for position C in FIG. 16 can be obtained.

A controller for controlling the position of the magnetic head produces a continuous position signal by comparing the absolute values of the N and Q position signals and connecting them by reversing the positive and negative values. In many servo patterns, a voice coil motor is controlled by setting the position associated with the N position signal of 0 as a target of following. Based on the difference between the position signal and the target position, the optimum current value charged to the voice coil motor is calculated. Then, predetermined operations such as the following and seek operations are performed.

The steps of forming the burst area will be explained briefly with reference to FIGS. 17(a) to 17(e) and 18(a) to 18(d). The portions defined by thick lines are patterns recorded in each step, and the width along the transverse direction of the pattern corresponds to the width of the recording track. A recording current pattern corresponding to each recorded pattern is shown under the portion defined by each thick line. As shown in FIGS. 14 and 15, the heads are moved at intervals of the data track, i.e. one half of the track pitch, while recording different patterns in phase. Some portions are written additionally, while other portions are erased by DC field. As a result, the burst area in the shape of hound's tooth check is recorded.

FIGS. 19(a) to 19(d) show the relation between a recorded magnetization pattern and a reproduced wave for both the longitudinal magnetic recording system and the perpendicular magnetic recording system in comparison. The longitudinal magnetic recording system has no response to the DC magnetization, and a single-peaked output is produced only at the transition. The reproduction of the recorded magnetization pattern shown in FIG. 19(a) assumes a waveform as shown in FIG. 19(b). As a result, a reproduced waveform as shown in FIG. 20(a) is obtained for the servo pattern described above, and the integrated signal of absolute value of waveform for producing the position signal information assumes a form as shown in FIG. 20(b). This indicates that the amplitude of each burst and that of a corresponding integrated signal coincide well in magnitude with each other.

However, a double-layer perpendicular recording medium having a soft magnetic under layer has a response to DC magnetization, and the reproduction for the recorded magnetization shown in FIG. 19(c) assumes a reproduced waveform as shown in FIG. 19(d). Thus, the reproduction for a servo pattern similar to that for longitudinal recording assumes a waveform which undesirably has a DC offset as shown in FIG. 21(a). The integrated signal of absolute value of waveform for producing the position signal information assumes a form as shown in FIG. 21(b), which fails to correctly represent the amplitude level of the burst signal. The actual circuits of the reproduction system such as the AGC and the read amplifier have a characteristic of lowering the DC component. Therefore, the reproduced waveform is distorted as shown in FIG. 22, and when integrated, a correct position signal cannot be produced due to the effect of the DC offset.

The burst signal portion of the burst area is arranged as described above in such a manner as to be surrounded by a large DC erased area as shown in FIG. 2. The feature of the double-layer perpendicular recording is that the shorter the wavelength, the smaller the demagnetization field in the recording bits, and hence the longer the wavelength, the larger the thermal demagnetization. FIG. 23 shows an example of the simulation result of the secular variations of the reproduced output for the recording densities of 20 KFCI, 100 KFCI and 300 KFCI, respectively. It is seen that the lower the recording density, i.e. the longer the wavelength for bits, the larger the output reduction. Due to a similar effect, the magnetic field generated by magnetization of the DC erased area described above affects the adjacent servo signal area and promotes the thermal demagnetization of the servo signal area.

In the case where the DC magnetization is recorded as a base for recording bits, a phenomenon is reported in which the track edge of the recorded bits shifts along the track width according to whether the particular track end coincides with the polarity of the base DC magnetization. The end of the burst signal area also shifts due to a similar phenomenon, thereby deteriorating the position signal quality.

Another problem of the prior art is that the maximum bit length of the signal recorded in the servo area is longer than the maximum bit length of the data area, and under this condition, the anti-signal decay performance of the servo area is weakest from design aspect, thereby making it impossible to secure reliability.

SUMMARY OF THE INVENTION

An object of the present invention is to solve the problem described above and to provide a longitudinal magnetic recording system wherein a signal with a shorter bit length than the burst signal, i.e. a signal of a shorter wavelength than the burst signal is recorded in what conventionally has been the DC erased area of the servo area or an area having a very long wavelength recorded therein. In this way, the demagnetization field in the servo area is reduced, and the anti-signal decay performance is improved while at the same time suppressing the shift of the end of the burst signal area for an improved servo signal quality. In this invention, the DC erased area of the servo area where a signal of a shorter wavelength than the burst signal is called a dummy area.

Generally, the sensitivity of the reproduction head decreases for a recording signal of a shorter wavelength. Once the wavelength of the signal recorded in the dummy area is sufficiently shortened, therefore, the reproduction amplitude from the signal recorded in the dummy area is substantially zero and has no effect on the detection of the position signal. In some cases, the wavelength of the recorded signal recorded in the dummy area cannot be shortened sufficiently due to the performance of the servo track writer, and the reproduced output of the signal recorded in the dummy area is sometimes large to a not negligible degree. In such a case, the effect of the recorded signal in the dummy area can be removed by using a LPF (Low Pass Filter) for lowering the signal of shorter wavelength than the signal recorded in the dummy area.

The servo track writer can be controlled more easily when the signal frequency recorded in the dummy area is set to an integer multiple of the signal frequency of the servo pattern. Then, the throughput of the system production can be increased for a higher cost effectiveness.

Another object of the invention is to provide a magnetic recording system, wherein the maximum bit length of the servo area is limited and shortened to the maximum bit length of the data area or less. In perpendicular recording, the thermal demagnetization of the low density signal is so large that the thermal fluctuation occurs most conspicuously in the portion of the recorded data on the media where the recording density is lowest. The servo pattern is indispensable data for positioning the head, and the need of preventing the disappearance thereof due to the thermal fluctuation is higher than that of the user data. For this purpose, the system is designed in such a manner that the recorded bit length of the burst signal area of the servo area is set to a length at least equal to the maximum bit length of the signal recorded in the disk, and under this condition, the anti-signal decay performance is secured. By designing the servo pattern in this way, the anti-signal decay performance of the servo pattern can be secured.

BRIEF DESCRIPTION OF THE DRAWINGS

FIG. 1 is a diagram for explaining a pattern of the burst area according to this invention.

FIG. 2 is a diagram for explaining a pattern of the burst area according to the prior art.

DESCRIPTION OF THE EMBODIMENTS

First Embodiment

A first embodiment will be explained. According to this embodiment, there is provided a longitudinal magnetic recording system in which a pattern having a recording density twice as high as the burst signal, i.e. having a bit length one half that of the burst signal is recorded in an area which has conventionally been a DC erased area (area II in FIG. 2), i.e. a dummy area, as shown in FIG. 1.

The steps of forming the burst area with a servo writer will be explained with reference to FIGS. 3(a) to 3(e) and 4(f) to 4(i). As in the conventional longitudinal recording system, a burst pattern is formed at pitches of one half track. In what has conventionally been the DC erased area, however, a pattern having bits one half of the burst signal area is recorded. As a result, a burst pattern of hound's tooth check is formed on both sides of the dummy signal area.

Figure 3A:
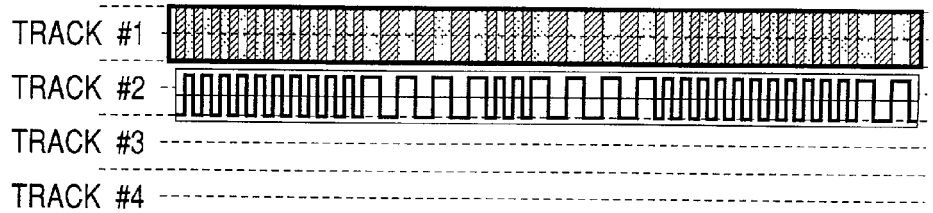
FIGS. 3(a) to 3(e) are a diagram for explaining the steps of forming a pattern of the burst area according to the invention.
Figure 3B:
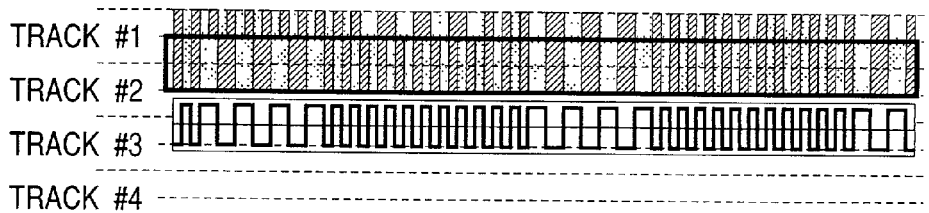
Figure 3C:
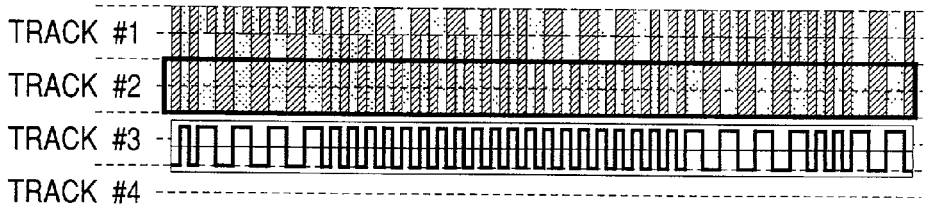
Figure 3D:
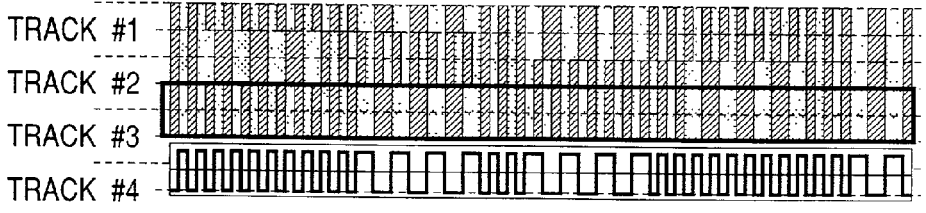
Figure 3E:
Figure 4A:
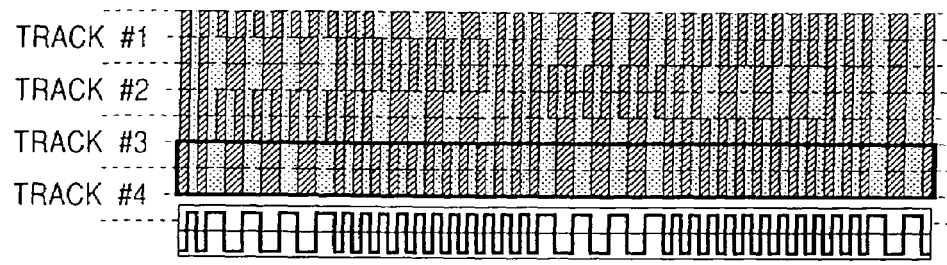
FIGS. 4 (a) to 4 (d) are a diagram for explaining the steps of forming a pattern of the burst area according to the invention.
Figure 4B:
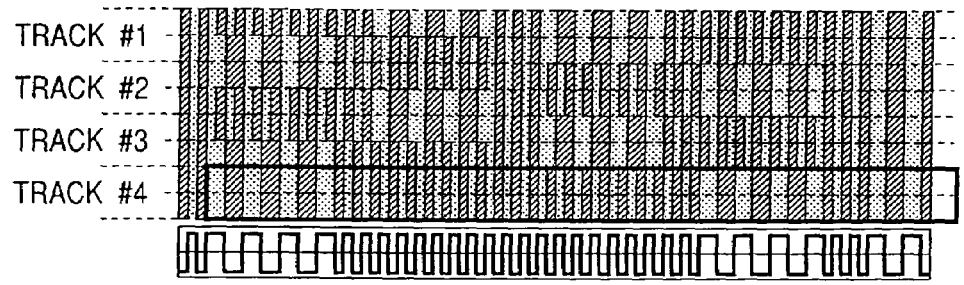
Figure 4C:
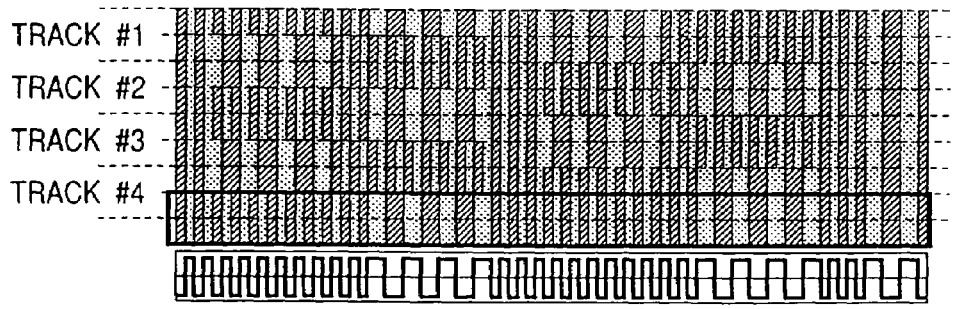
Figure 4D:
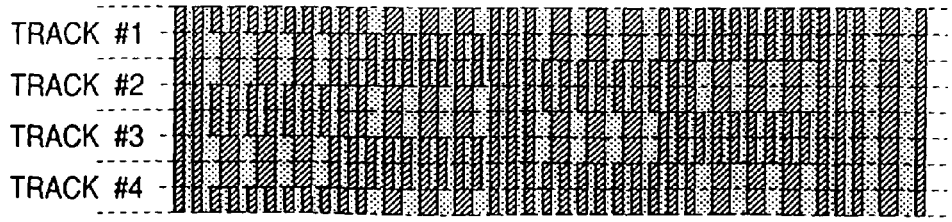
Figure 5:
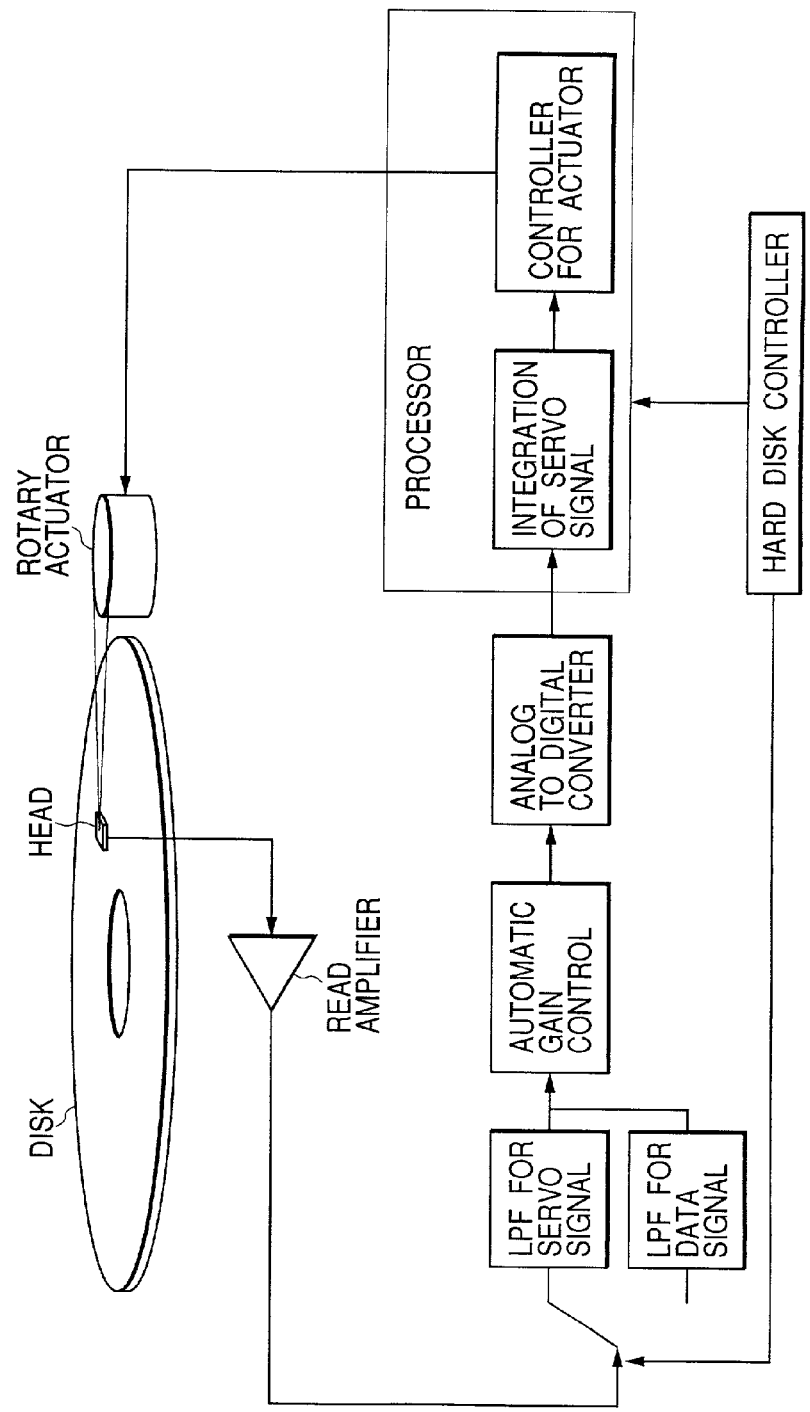
FIG. 5 is a diagram for explaining a configuration of the servo system according to a first embodiment of the invention.

FIG. 5 shows an outline of the servo system configuration. The longitudinal magnetic recording system also often comprises a LPF for lowering the high-frequency noise in the stage following the read amplifier. In many cases, however, a servo LPF is also used as a data LPF at the same time. According to this embodiment, an LPF for lowering the signal from the dummy area is used to reduce the cut-off frequency of the LPF as compared with that of the LPF used for reproducing the recorded signal in the user data area. A selector is arranged in the stage before the LPF and the switching operation of the selector is controlled by a HDC (Hard Disk Controller).

Figure 6:
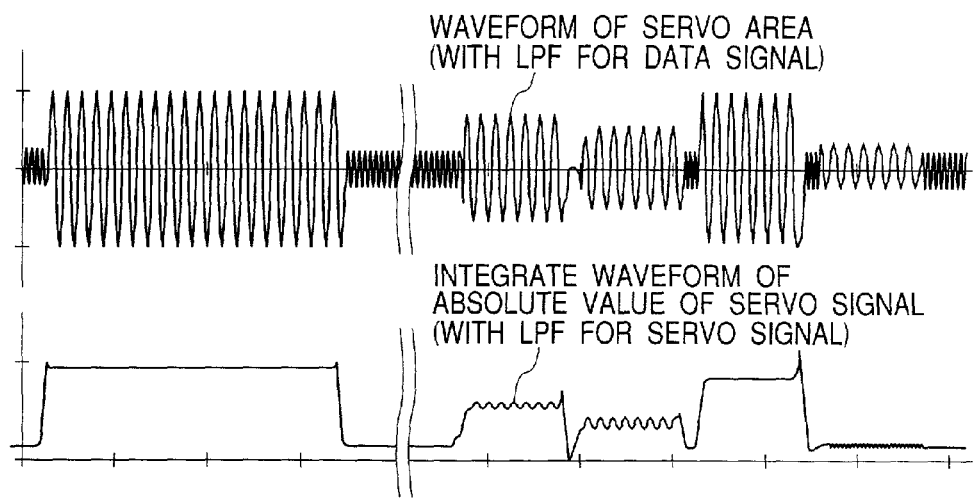
FIG. 6 is a diagram for explaining the reproduced waveform of the servo area in the case where a data LPF is used according to a first embodiment of the invention.
Figure 7:
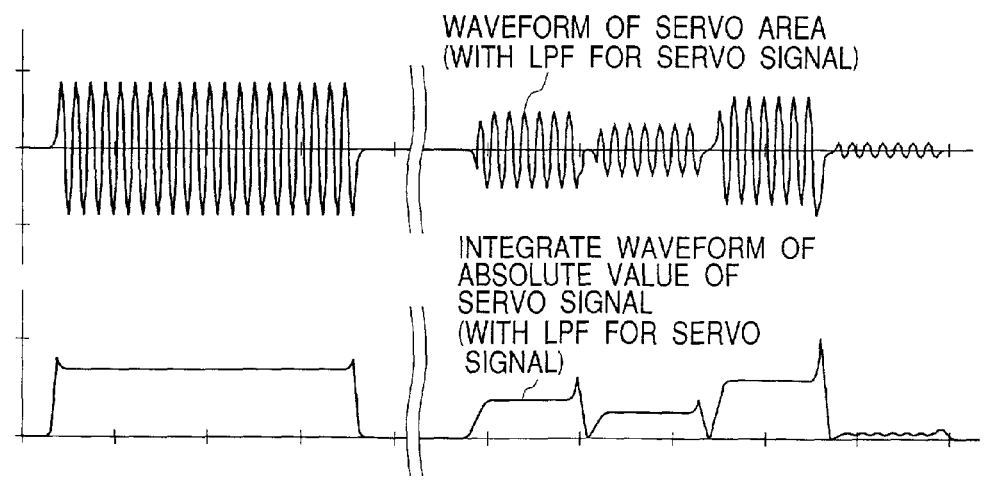
FIG. 7 is a diagram is a diagram for explaining the reproduced waveform of the servo area according to the first embodiment of the invention.

The recording density of the burst signal area is considerably lower than the maximum recording density of the data area. In other words, the frequency of the recorded signal in the burst signal area is considerably lower than that in the data area. According to this embodiment, the frequency of the dummy signal area is twice as high as the frequency of the burst signal area. A frequency twice as high, however, cannot still permit the reproduced signal from the dummy signal area to be ignored. In the case where a LPF set in the same manner as in the data area is used for the servo area, therefore, a signal is undesirably produced even in an area where the signal should otherwise be zero as shown in FIG. 6, thereby deteriorating the quality of the position signal. In view of this, a LPF having such a cut-off frequency is provided as to sufficiently pass the burst signal frequency while cutting off the signal of the dummy signal area. In this way, the amplitude of the dummy signal area can be reduced substantially to zero. In this embodiment, the frequency of the dummy area is twice as high as that of the burst signal area. Therefore, the cut-off frequency of the LPF for the servo area is set to 1.5 times as high as the frequency of the burst signal. As a result, the reproduced signal in the burst area, as shown in FIG. 7, assumes a waveform substantially similar to that of the integrated waveform of the absolute value for longitudinal recording. Thus, the conventional servo control method can be used as it is.

The present embodiment uses a system having two LPFs which are switched appropriately. Alternatively, it is of course possible to use a single LPF having a variable cut-off frequency which is switched as required.

Second Embodiment

Figure 8:
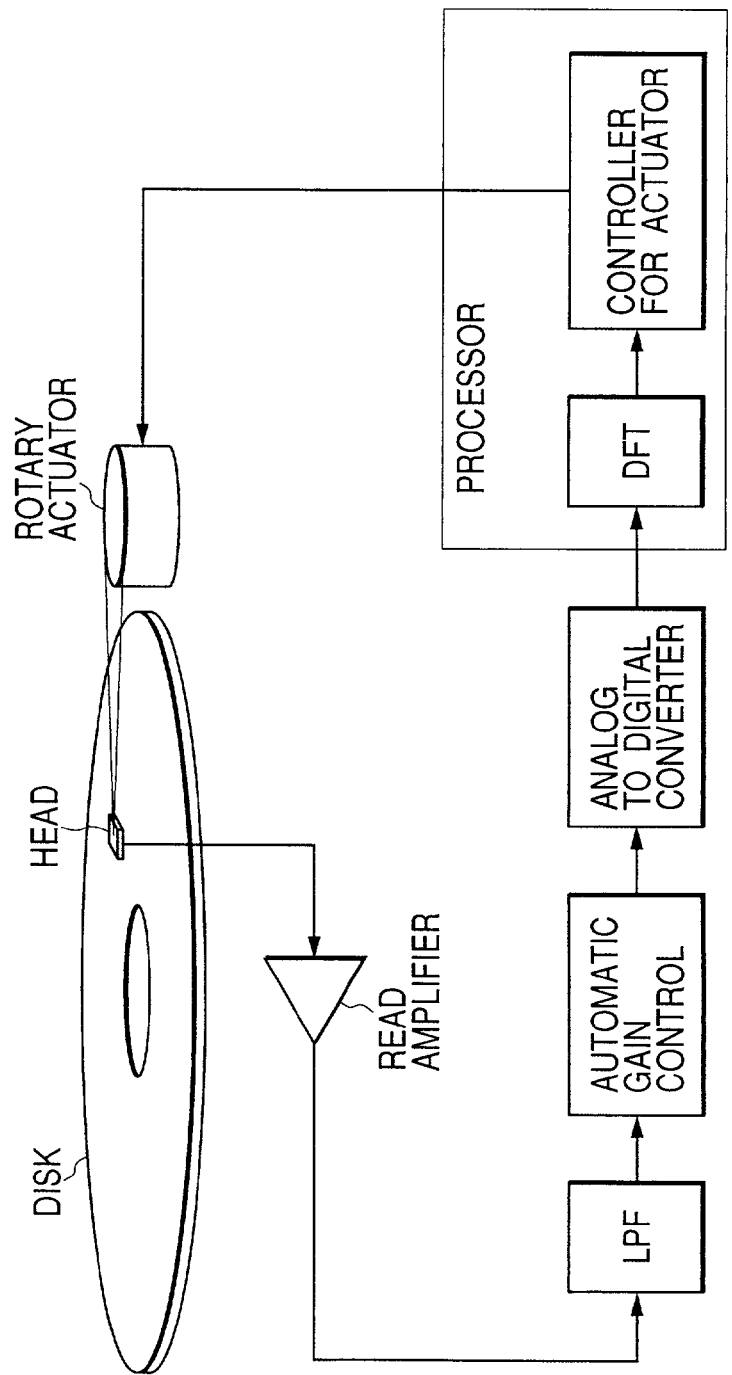
FIG. 8 is a diagram for explaining a configuration of the servo system according to a second embodiment of the invention.

A second embodiment will be explained. According to this embodiment, the steps of forming the burst area are exactly the same as those of the first embodiment, but the servo signal processing system is different. FIG. 8 shows an outline of the processing system. Unlike the first embodiment in which the amplitude is calculated by integrating the absolute value, the present embodiment is such that the frequency component is detected (phase is detected) by use of DFT (Discrete Fourier Transform) thereby to control the position signal. The phase is detected by the frequency but not by the amplitude of the servo signal and that the frequency of the dummy area is different from that of the burst signal area. Therefore, the frequencies of the dummy area and the burst signal area can be discriminated readily. Thus, the LPF for the servo area is eliminated, and a LPF similar to that for the data area can be used.

Third Embodiment

A third embodiment will be explained. According to this embodiment, the steps of forming the burst area and the servo signal processing system are exactly the same as those of the second embodiment. In this embodiment, however, the recording density of the burst signal area is subjected to certain conditions. As described above, the thermal demagnetization of the low-density signal is large in perpendicular recording. That portion of the recorded data on the media which has the lowest recording density, therefore, most easily-succumbs to the thermal fluctuation. According to this embodiment, the burst signal is recorded with a bit length shorter than the maximum bit length limited by the recorded code in the data area.

Figure 9:
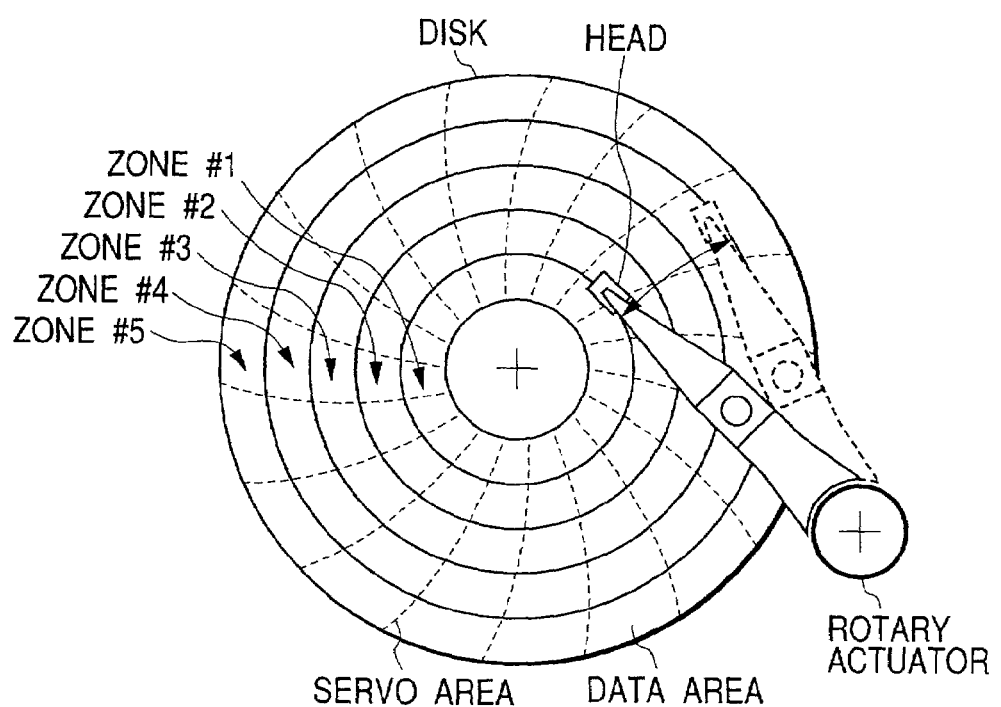
FIG. 9 is a diagram for explaining the system configuration according to a third embodiment of the invention.
Figure 10:
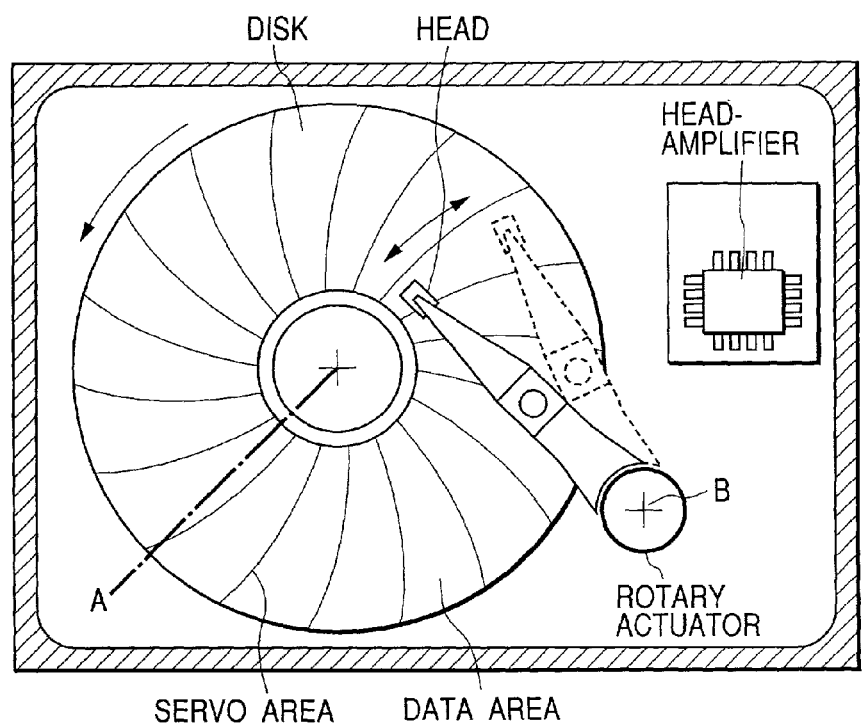
FIG. 10 is a plane view showing an example of the structure of an ordinary magnetic recording system.
Figure 11:
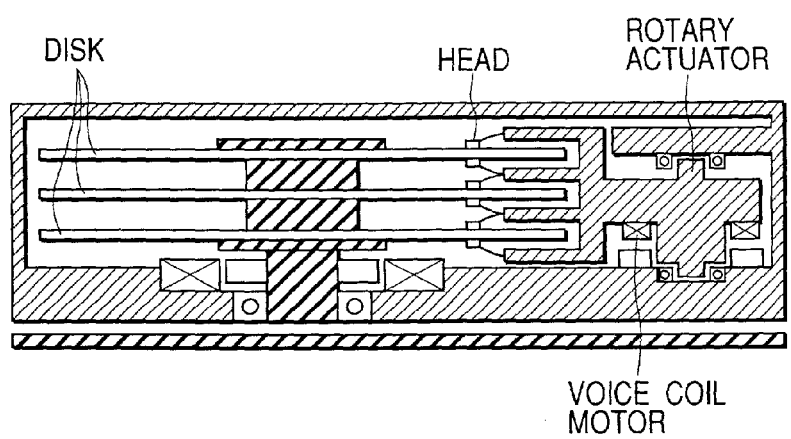
FIG. 11 is a sectional view showing an example of the structure of an ordinary magnetic recording system.
Figure 12:
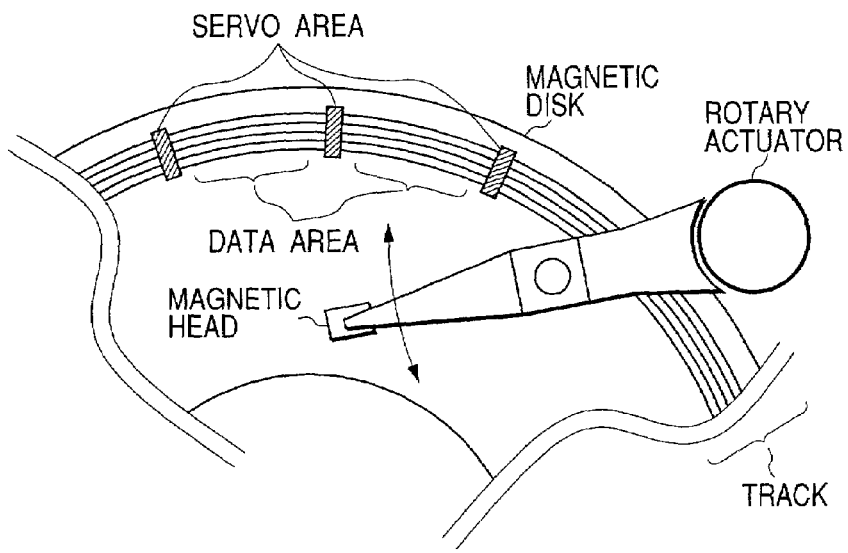
FIG. 12 is an enlarged view showing an example of the structure of an ordinary magnetic recording system.
Figure 13:
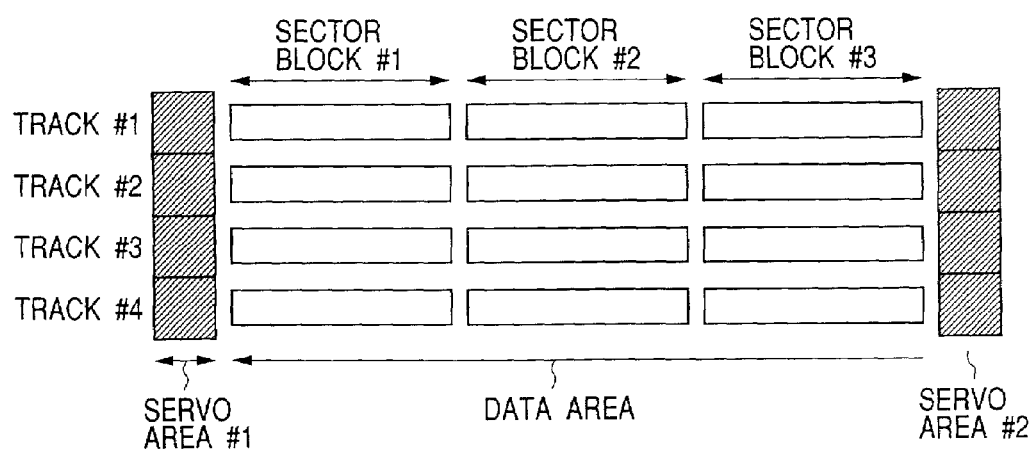
FIG. 13 is a diagram for explaining an example of the structure of the tracks of an ordinary magnetic recording system.
Figure 14:
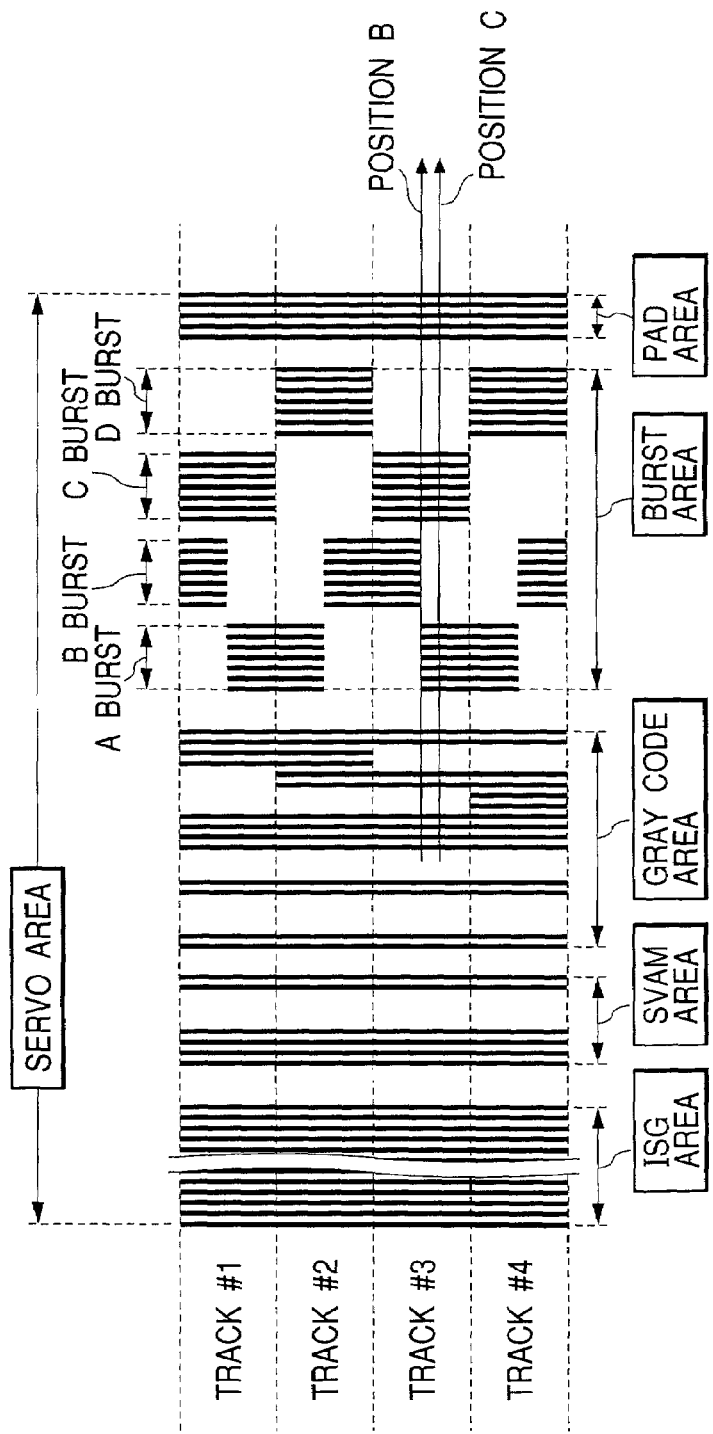
FIG. 14 is a diagram for explaining a servo pattern of an ordinary magnetic recording system.
Figure 15:
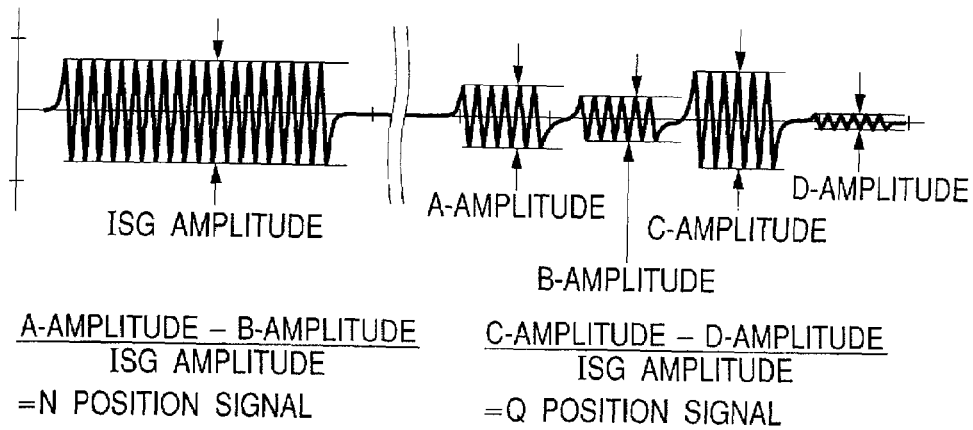
FIG. 15 is a diagram for explaining a reproduced waveform of the servo pattern of an ordinary magnetic recording system.
Figure 16:
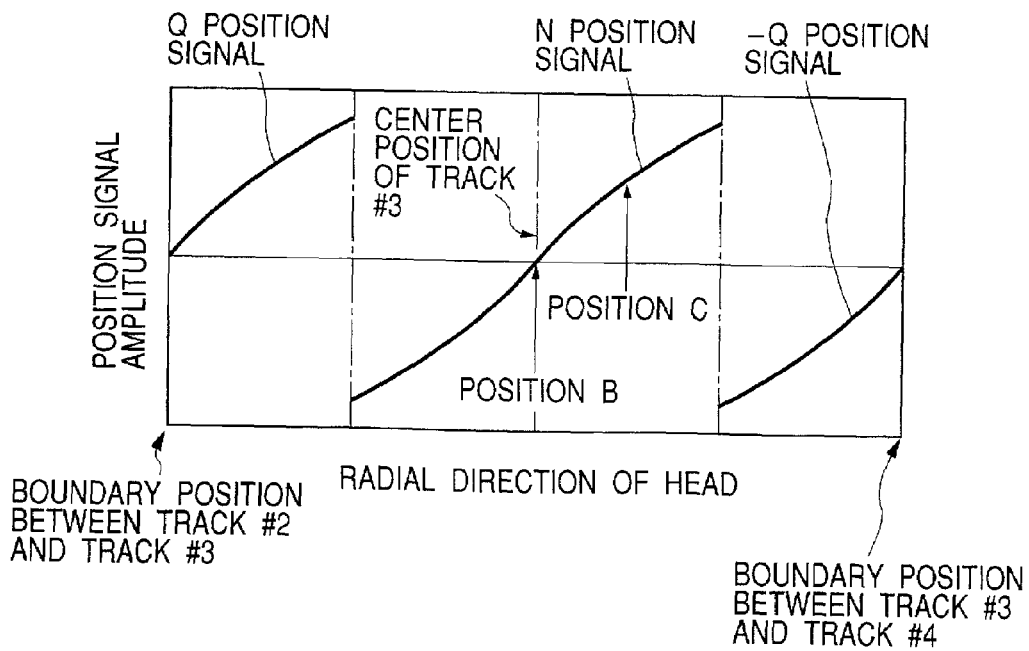
FIG. 16 is a diagram for explaining the position signal of an ordinary magnetic recording system.
Figure 17A:
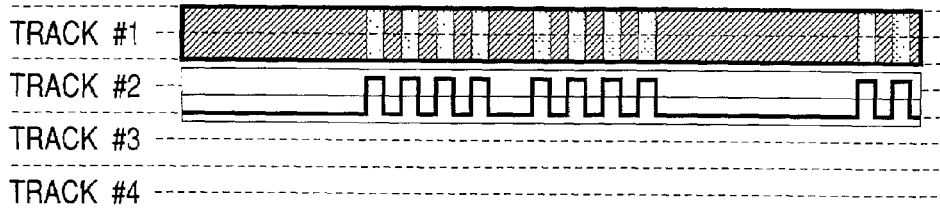
FIGS. 17(a) to 17(e) are a diagram for explaining the steps of forming a servo pattern of an ordinary magnetic recording system.
Figure 17B:
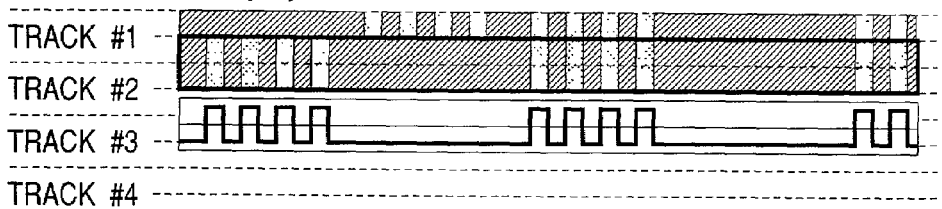
Figure 17C:
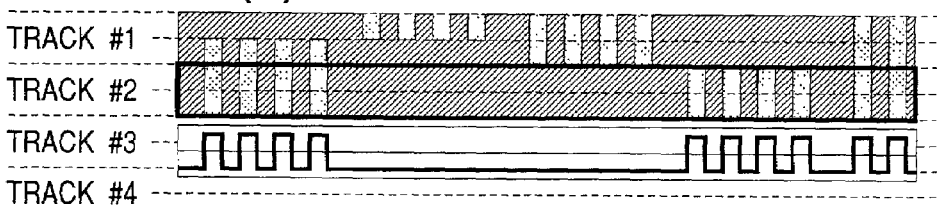
Figure 17D:
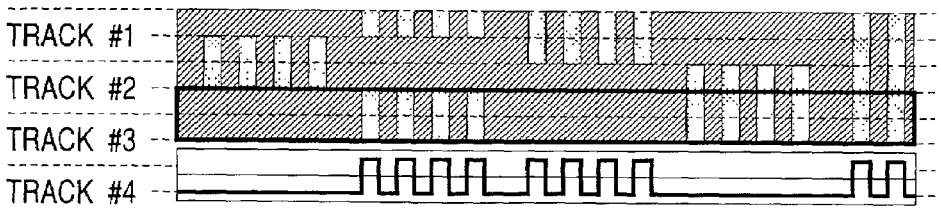
Figure 17E:
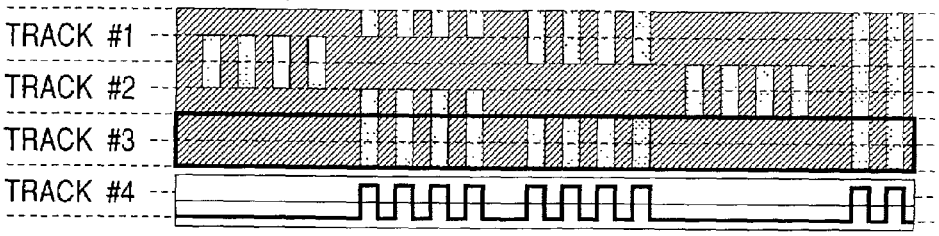
Figure 18A:
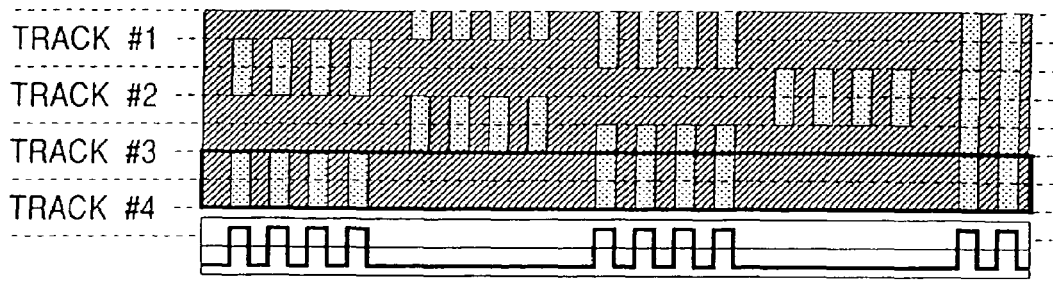
FIGS. 18(a) to 18(d) are a diagram for explaining the steps of forming a servo pattern of an ordinary magnetic recording system.
Figure 18B:
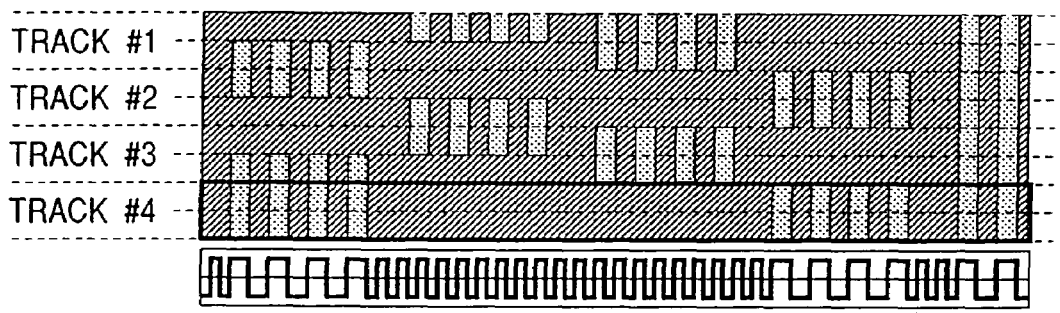
Figure 18C:
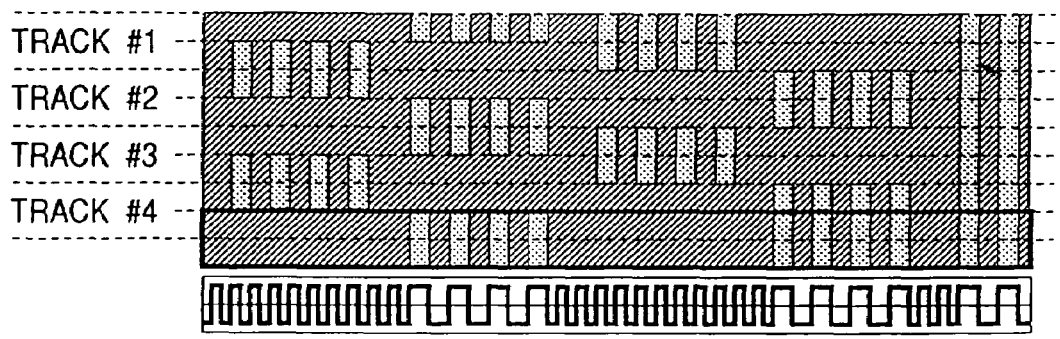
Figure 18D:
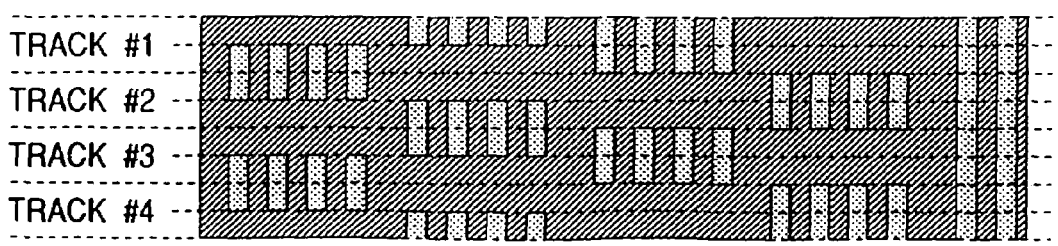
Figure 19A:
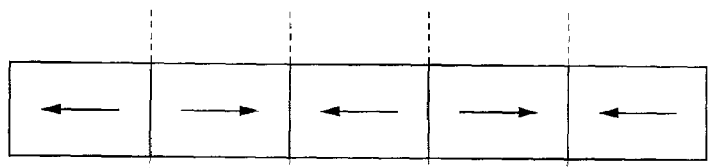
FIGS. 19(a) to 19(d) are a diagram for explaining the difference of reproduction between longitudinal recording and perpendicular recording.
Figure 19B:
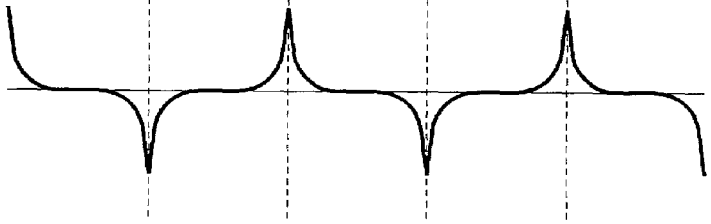
Figure 19C:
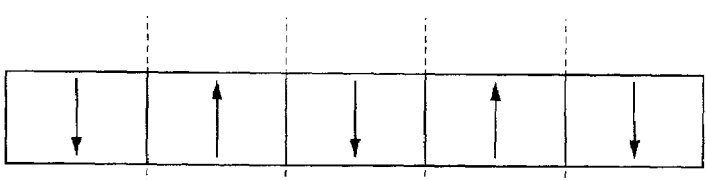
Figure 19D:
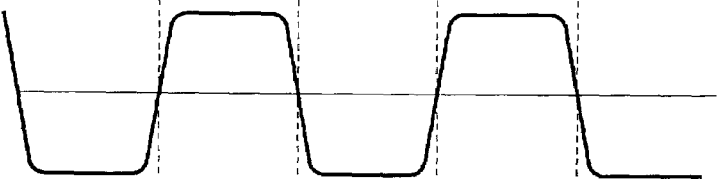
Figure 20A:
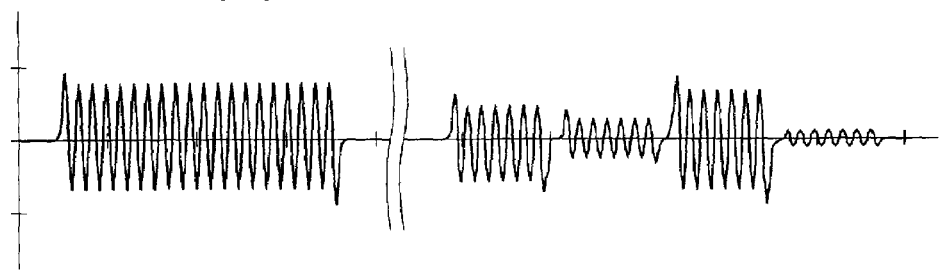
FIGS. 20(a) and 20(b) are a diagram for explaining a reproduced waveform in an application of the servo pattern of the conventional magnetic recording system to longitudinal recording.
Figure 20B:
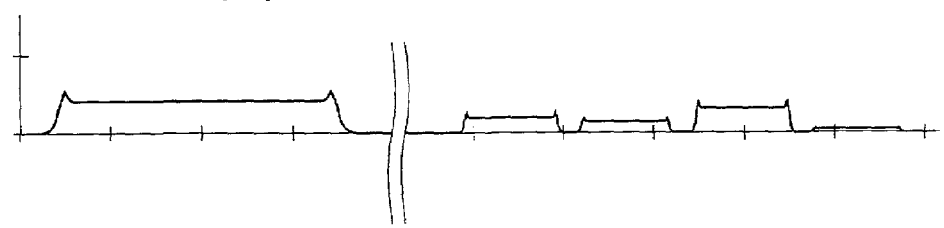
Figure 21A:
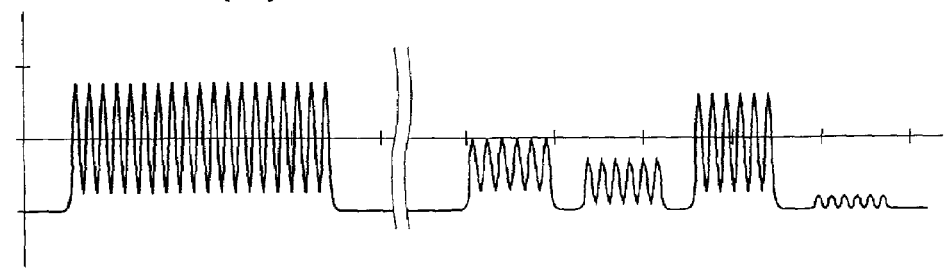
FIGS. 21(a) and 21(b) are a diagram for explaining a reproduced waveform in an application of the servo pattern of the conventional magnetic recording system to perpendicular recording.
Figure 21B:
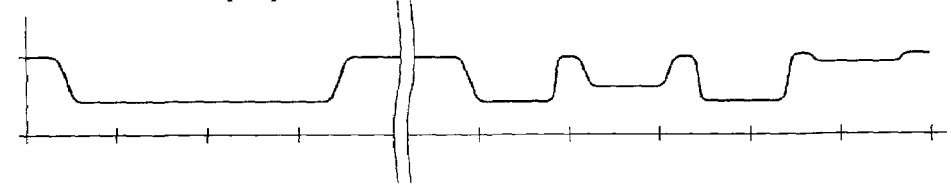
Figure 22:
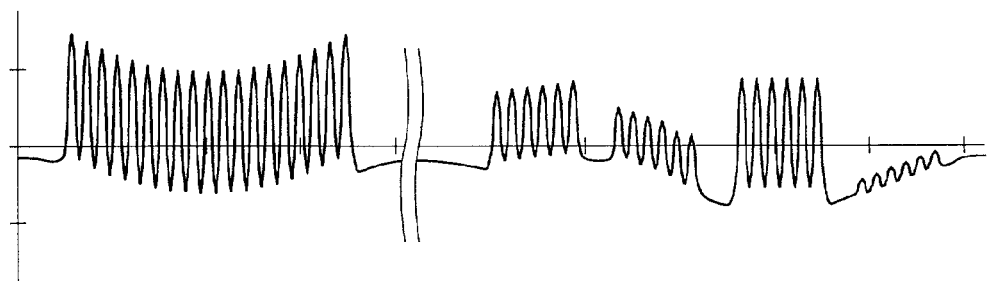
FIG. 22 is a diagram for explaining a reproduced waveform in an application of the servo pattern of the conventional magnetic recording system to the perpendicular recording with a reproduction system having a low-pass filter.
Figure 23:
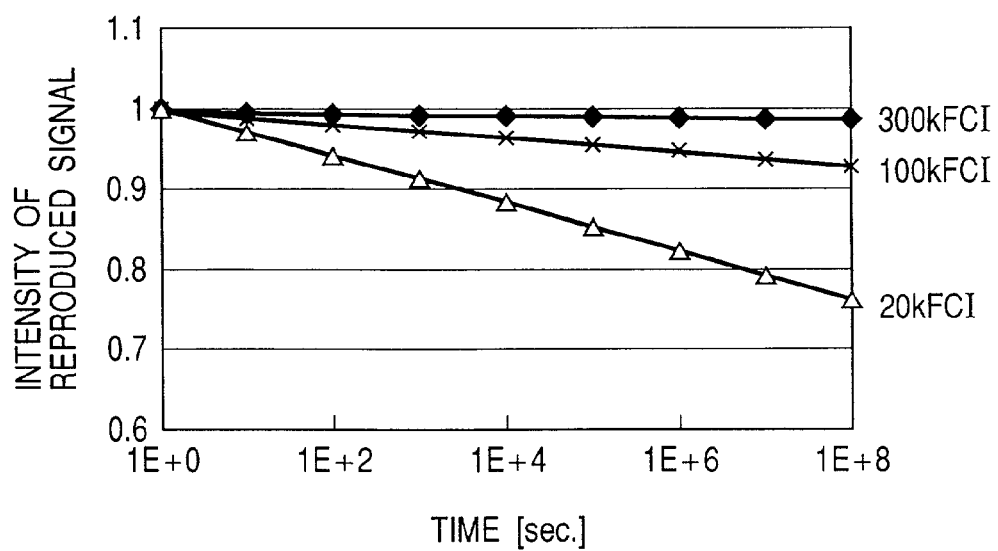
FIG. 23 is a diagram for explaining the thermal demagnetization characteristic of perpendicular magnetic recording.

This embodiment uses a code having the efficiency of 32/33 in which 33 recorded bits are assigned to 32 user data bits as a recorded code. With this code, the longest recorded bits are ten times as long as the shortest recorded bits. The magnetic recording system according to this embodiment is divided into radial zones as shown in FIG. 9, and data are recorded in each zone with a fixed transfer rate. The linear recording density at each radial position is determined by the relation between each radial position and transfer rate. According to this embodiment, the recording density is lowest for the outermost peripheral zone, of which the maximum bit length is equal to that of the data area of the system. The recording density of the burst signal area of the servo area, therefore, is required to be set to a length equal to or shorter than the maximum bit length. According to this embodiment, the recording density of the burst signal area is set to the same bit length as the maximum bit length. Therefore, the bit length of the dummy signal area is set to twice as long.

As a result, the maximum bit length in the system coincides with the maximum bit length of the data area. As long as the anti-signal decay performance is secured under this condition, therefore, the anti-signal decay performance of the servo signal can be secured. In this way, the reliability of the system is secured.

The first to third embodiments described above use perpendicular magnetic recording media having a soft magnetic backing layer. Even in the case where a single-layer perpendicular magnetic recording medium lacking a soft magnetic backing layer is used, however, the same concept applies to thermal demagnetization. Thus, the lower the density of a recorded signal, the larger the thermal demagnetization. Also, the processing in the servo area, though different in reproduced waveform, can be performed in exactly the same way. Thus, the present invention is effectively applicable even to the perpendicular magnetic recording media having no soft magnetic backing layer.

It will thus be understood from the foregoing description that according to this invention, there is provided a magnetic recording system using perpendicular magnetic recording media, wherein a servo control method similar to that for the longitudinal recording can be used for a reduced development cost. Also, the fact that the long wavelength signal which easily succumbs to thermal demagnetization is not used can achieve a thermal stability. Further, by suppressing the variations of the burst signal along the track width, the positioning operation can be performed using a highly accurate position signal. Thus, a highly reliable magnetic recording system of large capacity can be provided.

The invention claimed is:

1. A magnetic recording system for perpendicular recording hard disk drives, comprising:
    a magnetic head for recording and reproducing information, and
    a perpendicular magnetic recording medium having a perpendicular magnetic recording layer, and
    a soft magnetic underlayer,
    said perpendicular magnetic recording layer having a burst area,
    said burst area having a first area with a burst signal recorded therein for positioning said magnetic head, and a second area with a dummy signal recorded therein, wherein said dummy signal is adapted to cancel a DC offset and further wherein
    a bit length of said dummy signal being less than a bit length of the burst signal.

2. A magnetic recording system according to claim 1, wherein the perpendicular magnetic recording medium has a response to DC magnetization.

3. A magnetic recording system according to claim 2, wherein said perpendicular magnetic recording layer further has a user data area with a user data signal recorded therein, and a bit length of the burst signal is less than or equal to a bit length of the user data signal.

4. A magnetic recording system according to claim 3, wherein a maximum bit length of the burst signal is less than or equal to a maximum bit length of the user data signal.

5. A magnetic recording system according to claim 1, wherein said perpendicular magnetic recording layer further has a user data area with a user data signal recorded therein, and a bit length of the burst signal is less than or equal to a bit length of the user data signal.

6. A magnetic recording system according to claim 5, wherein a maximum bit length of the burst signal is less than or equal to a maximum bit length of the user data signal.

7. A magnetic recording system according to claim 1, wherein the bit length of said burst signal is twice the bit length of said dummy signal.

8. A magnetic recording system according to claim 1, wherein the bit length of said burst signal is an integer multiple of the bit length of the dummy signal.

9. A magnetic recording system for perpendicular recording hard disk drives, comprising:
  a magnetic head for recording and reproducing information; and
  a perpendicular magnetic recording medium having a perpendicular magnetic recording layer, and
  a soft magnetic underlayer,
  said perpendicular magnetic recording layer having a burst area,
  said burst area having a first area with a burst signal recorded therein for positioning said magnetic head, and a second area with a dummy signal recorded therein, wherein said dummy signal is adapted to cancel a DC offset and further wherein
  said burst area is formed with a bit length of said dummy signal less than a bit length of the burst signal, such that the burst signal is extractable from said burst area.

10. A magnetic recording system according to claim 9, further comprising: a controller which extracts the burst signal element from said burst area.

11. A magnetic recording system according to claim 9, wherein the perpendicular magnetic recording medium has a response to DC magnetization.

12. A magnetic recording system according to claim 9, wherein the bit length of said burst signal is twice the bit length of said dummy signal.

13. A magnetic recording system according to claim 9, wherein the bit length of said burst signal is an integer multiple of the bit length of the dummy signal.

14. A magnetic recording system for perpendicular recording hard disk drives, comprising:
  a magnetic head for recording and reproducing information, and
  a perpendicular magnetic recording medium having a perpendicular magnetic recording layer, and
  a soft magnetic underlayer,
  said perpendicular magnetic recording layer having a burst area,
  said burst area having a first area with a burst signal recorded therein for positioning said magnetic head, and a second area with a dummy signal recorded therein, wherein said dummy signal is adapted to cancel a DC offset and further wherein
  a frequency of said dummy signal is higher than a frequency of the burst signal.

15. A magnetic recording system according to claim 14, wherein the perpendicular magnetic recording medium has a response to DC magnetization.

16. A magnetic recording system according to claim 14, wherein the frequency of said dummy signal is twice as high as the frequency of the burst signal.

17. A magnetic recording system according to claim 14, wherein the frequency of said dummy signal is an integer multiple of the frequency of the burst signal.

18. A magnetic recording system for perpendicular recording hard disk drives, comprising:
  a magnetic head for recording and reproducing information, and
  a perpendicular magnetic recording medium having a perpendicular magnetic recording layer, and
  a soft magnetic underlayer,
  said perpendicular magnetic recording layer having a burst area,
  said burst area having a first area with a burst signal recorded therein for positioning said magnetic head, and a second area with a dummy signal recorded therein, wherein said dummy signal is adapted to cancel a DC offset and further wherein
  said burst area is formed with a frequency of said dummy signal higher than a frequency of the burst signal, such that the burst signal is extractable from said burst area.

19. A magnetic recording system according to claim 18, wherein the perpendicular magnetic recording medium has a response to DC magnetization.

20. A magnetic recording system according to claim 18, further comprising: a controller which extracts the burst signal element from said burst area.

21. A magnetic recording system for perpendicular recording hard disk drives, comprising:
  a magnetic head for recording and reproducing information, and
  a perpendicular magnetic recording medium having a perpendicular magnetic recording layer, and
  a soft magnetic underlayer,
  said perpendicular magnetic recording layer having a burst area,
  said burst area having a first area with a burst signal recorded therein for positioning said magnetic head, and a second area with a dummy signal recorded therein, wherein said dummy signal is adapted to cancel a DC offset and further wherein
  a recording density of said dummy signal is higher than a recording density of the burst signal.

22. A magnetic recording system according to claim 21, wherein the perpendicular magnetic recording medium has a response to DC magnetization.

23. A magnetic recording system for perpendicular recording hard disk drives, comprising:
  a magnetic head for recording and reproducing information; and
  a perpendicular magnetic recording medium having a perpendicular magnetic recording layer, and
  a soft magnetic underlayer,
  said perpendicular magnetic recording layer having a burst area,
  said burst area having a first area with a burst signal recorded therein for positioning said magnetic head, and a second area with a dummy signal recorded therein, wherein said dummy signal is adapted to cancel a DC offset and further wherein
  said burst area is formed with a recording density of said dummy signal higher than a recording density of the burst signal, such that the burst signal is extractable from said burst area.

24. A magnetic recording system according to claim 23, wherein the perpendicular magnetic recording medium has a response to DC magnetization.

25. A magnetic recording system according to claim 23, further comprising: a controller which extracts the burst signal element from said burst area.

* * * * *